United States Patent
Reusens

(10) Patent No.: US 7,003,089 B1
(45) Date of Patent: Feb. 21, 2006

(54) SPLITTER FOR ANALOG TELEPHONE SIGNAL AND DIGITAL DATA

(75) Inventor: Peter Paul Frans Reusens, Laarne (BE)

(73) Assignee: Alcatel, Paris (FR)

(*) Notice: Subject to any disclaimer, the term of this patent is extended or adjusted under 35 U.S.C. 154(b) by 815 days.

(21) Appl. No.: 09/707,975

(22) Filed: Nov. 8, 2000

(30) Foreign Application Priority Data

Nov. 19, 1999 (EP) ............................... 99402898

(51) Int. Cl.
*H04M 3/02* (2006.01)
(52) U.S. Cl. ............... 379/252; 379/373.01; 379/93.06
(58) Field of Classification Search ........ 379/251–255, 379/373.01–373.05, 418, 413.01, 374.01–376.02
See application file for complete search history.

(56) References Cited

U.S. PATENT DOCUMENTS

| | | | | |
|---|---|---|---|---|
| 3,591,728 A | * | 7/1971 | Birck ......................... 379/382 |
| 4,042,786 A | * | 8/1977 | Freimanis ............... 379/373.01 |
| 4,189,626 A | * | 2/1980 | Malerba et al. ......... 379/375.01 |
| 4,197,433 A | * | 4/1980 | Bronner ...................... 455/401 |
| 5,757,803 A | * | 5/1998 | Russell et al. ............... 370/494 |
| 6,144,733 A | * | 11/2000 | Amrany et al. ......... 379/399.01 |
| 6,324,268 B1 | * | 11/2001 | Balachandran et al. .. 379/93.08 |
| 6,400,803 B1 | * | 6/2002 | Tate et al. ............... 379/27.06 |
| 6,477,249 B1 | * | 11/2002 | Williamson et al. ..... 379/93.01 |

FOREIGN PATENT DOCUMENTS

EP 0 740 451 A1 10/1996

\* cited by examiner

*Primary Examiner*—Daniel Swerdlow
(74) *Attorney, Agent, or Firm*—Sughrue Mion, PLLC

(57) ABSTRACT

In a telephone system where frequency multiplexed analog telephone signals and digital data signals are transmitted over a line, incoming calls are announced to the customer installation by a ringing indication signal having an amplitude between 1 and 30 V RMS, which is much less than the regular ringing and therefore easier to be generated, and moreover having a smoother shape than a rectangular shape. Upon receiving the ringing indication signal, the customer installation locally generates and provides a full ringing signal to a telephone. The amplitude of this local ringing signal is higher than the amplitude of the ringing indication signal, but the line with the digital data signal is isolated from the customer telephone equipment at the time the ringing signal is generated, so as to avoid disturbance of the digital data transmission by the ringing current, which is a source of impulsive noise.

25 Claims, 3 Drawing Sheets

SPLITTER FOR ANALOG TELEPHONE SIGNAL AND DIGITAL DATA

BACKGROUND OF THE INVENTION

The invention relates to simultaneous transmission of an analogue telephone signal and digital data over a twisted pair telephone line between a central office (CO) and customer premises (CP).

According to the ADSL (Asymmetric Digital Subscriber Line) principles, it is known to transfer the telephone signal and digital data in different frequency bands: FIG. 1 shows the proposed spectrum according to ADSL, with bands TB, UDB and DDB. Frequency (F) is plotted on the horizontal axis of the diagram, and amplitude (A) is plotted on the vertical axis. TB stands for Telephone Band and is the band used for bi-directional transmission of usual POTS (Plain Old Telephone Service) analogue signals. UDB and DDB respectively stand for upstream transmission digital data band and downstream transmission digital data band; UDB is the frequency band reserved for upstream transmission of digital data (from customer premises to central office). DDB is the frequency band reserved for downstream transmission of digital data (from central office to customer premises). In practice the UDB and DDB can be organised with spectral overlap, either partially or fully, called echo-cancelled duplexing or with a full separation between UDB and DDB, called frequency division duplexing.

In the central office (CO) of the system and at the customer premises (CP), a splitter (SPLIT) is provided including a low pass filter and a high pass filter to separate the telephone signal and the digital data. This is called frequency division multiplexing.

In such a known ADSL-like system, the ringing signal sent from the central office (CO) to the customer premises (CP) to announce an incoming telephone call has a voltage around 70 Volt RMS, as usual in POTS. This signal is directly used for driving the ringer of the telephone. In most existing implementations it has therefore a rectangular shape, or more specifically sharp edges, and contains consequently disturbing high frequency components. It is sent over the telephone line in parallel with the digital data. As a comparison, POTS AC signal, apart from the DC ringing signals, have a power around 1 mW or less than 1 V RMS on 600 Ohm, while ADSL AC signals have a power around 100 mW or less than 3 V RMS on the characteristic impedance of 100 Ohm.

A known ADSL system is disclosed in the contribution to the ANSI (American National Standard Institute) standard T1E1.4 on ADSL (Asymmetric Digital Subscriber Line) with reference T1.E1.4/93-025. This standard contribution is entitled 'VLSI DMT Implementation for ADSL' and originates from Amati Communications Corporation. Therein, the central office unit and remote terminal (or customer premises) of an ADSL system consist of a digital interface, a digital signal processor and an analogue interface. The analogue interface of the known system comprises a POTS Splitter, connected to the telephone line, to an ADSL arrangement, and to a POTS arrangement. The splitter separates signals incoming from the telephone line: it directs digital data to the ADSL arrangement, and the analogue POTS signals to the POTS arrangement. For outgoing signals, the splitter combines digital data signals coming from the ADSL arrangement and POTS signals coming from the POTS arrangement. The POTS arrangement as well as the ADSL arrangement each contain a transmitting path and a receiving path. The receiving path, as is illustrated for the ADSL arrangement in this contribution, includes line coupling circuitry, a filter and automatic gain controller, an analogue to digital converter ADC and a digital processor. Similarly, the transmitting path of the ADSL arrangement of the cited standard contribution includes a digital signal processor, a digital to analogue converter DAC, a filter, amplifier and line coupling circuitry.

SUMMARY OF THE INVENTION

The invention addresses the problem of splitting the analogue and digital signals in such a telephone system where analogue telephony signals and digital data are frequency multiplexed. It is based on the recognition that the cost of the splitter is increased due to the fact that the splitter has to separate a high voltage ringing signal and digital data. In addition, the rectangular shape of the ringing signal produces high frequency harmonics that are perceived as impulsive noise disturbing the digital data transmission. Furthermore, the ringing signal although sinusoidal at the source, is received at the remote end in many parallel ringing circuits of the individual telephones at the customer premises. In older equipment the ringer is a mechanical bell, and the current is sinusoidal, with little distortion. However, in modern sets the ringer is based on semiconductor circuits, which rectify the voltage to deliver power to the acoustical transducer. This treatment will cause the current to contain spikes and to be highly non-linear, with an impulsive noise as result, which is in the transmission band of the digital data transmission.

The invention makes it possible to simplify the design of the splitter, without enduring major bit errors in the digital data transmission during transmission of the ringing signal. It provides ways to generate the POTS and the digital data transmission signals from a single driver, which is not feasible when the ringing is the conventional high voltage signal as used in the past.

More specifically, the invention provides a telephone system wherein analogue telephone signals are frequency multiplexed with digital data signals for transmission over a line, and wherein an incoming telephone call is announced by a ringing indication signal having a voltage amplitude less than 30 V RMS.

Preferably, the ringing indication signal has a voltage amplitude less than 20 V RMS, and higher than 1 V RMS or 10 V RMS.

In one embodiment, the ringing indication signal has a spectrum causing no detectable components in the frequency band for digital data signals. This may be the case where the ringing indication signal has a frequency lower than the frequency of analogue telephone signals.

In another embodiment, the ringing indication signal has a frequency that is one frequency of a set of available data carriers for digital signals, said digital data signals being transmitted using data carriers with frequency above said one frequency. For instance, in an ADSL based system, the ringing indication signal could be transmitted using 4.3125 kHz times a small integer (1, 2, . . . ); this is still in the frequency range of the POTS signals but lower than the edge of the frequency range used for the actual digital transmission.

The invention also provides a central office installation for transmitting and receiving over a line frequency multiplexed analogue telephone signals and digital data signals, comprising a splitter for demultiplexing and multiplexing analogue telephone signals and digital data signals, a digital data signals device connected to the splitter for transmitting and receiving digital data signals, and an analogue telephone signals device connected to the splitter for transmitting and receiving analogue data signals, wherein the analogue telephone signals device transmits a ringing indication signal for announcing an incoming telephone call, said ringing indication signal having a voltage amplitude less than 30 V RMS.

In one embodiment, the analogue telephone signals device transmits a ringing signal for announcing an incoming telephone call when said digital data signals device does not receive digital data signals, said ringing signal having a voltage amplitude higher than said ringing indication signal.

The splitter may also comprise a low pass filter for filtering analogue telephone signals, and a high pass filter for filtering digital data signals, the order of said low pass and high pass filters being less than 5, and preferably less than 2 or equal to 2.

The invention also provides a splitter for transmitting and receiving over a line port frequency multiplexed analogue telephone signals and digital data signals, said splitter comprising means for demultiplexing and multiplexing analogue telephone signals and digital data signals, a telephone port for transmitting and receiving analogue telephone signals to and from said demultiplexing and multiplexing means, and ringing signal generation means for generating a ringing signal applied to the telephone port when a ringing indication signal is received over said line port, said ringing signal having a voltage amplitude higher than said ringing indication signal.

Preferably, the splitter further comprises switching means for isolating said telephone port from said line port when a ringing signal is generated and applied to said telephone port.

The demultiplexing and multiplexing means may comprise a low pass filter for filtering analogue telephone signals, and a high pass filter for filtering digital data signals, the order of said low pass and high pass filters being less than 5, and preferably less than 2 or 2.

The splitter may also comprise a digital data signals port for transmitting and receiving digital data signals to and from said demultiplexing and multiplexing means, switching means between said digital data signals port and said line port, and power detection means for detecting improper power supply to the splitter and for opening said switching means when improper power supply is detected.

BRIEF DESCRIPTION OF THE DRAWINGS

A telephony system embodying the invention will now be described, by way of non-limiting example only, and in reference to the drawings, where.

DETAILED DESCRIPTION OF THE INVENTION

The invention is based on the recognition that the design of the splitter is easier where the voltage of the ringing signal is lower than the voltage presently proposed. It therefore suggests replacing the ringing signal with a ringing indication signal with reduced amplitude; the ringing indication signal is not used for directly driving the ringer of a telephone, and may therefore have any detectable shape. In a preferred embodiment, the invention makes it possible to maintain usual telephone service, with the usual ringing signal, including the correct cadence of this ringing signal.

Using a ringing indication signal with reduced amplitude, and with a non-rectangular shape makes it possible to simplify the filters used in the splitters. The order of the low pass filters and high pass filters in the splitters can be reduced significantly, from 7 to as low as 2. The filters may thus have an order less than 5 in all instances, and preferably an order of 2. This also makes it possible to reduce the frequency gap between POTS and digital bands. This statement applies to both the splitter low pass filter at the customer side and at the central office side if present, as in FIG. 2.

A further effect of the low pass order reduction will be audible in the POTS signal quality. Indeed, the effect of the filters inserted in the POTS transmission chain cause effects such as echoes and amplitude and phase distortion. By reducing the order of the filters, these effects will be less disturbing and the desired quality of the POTS audio chain is attainable at a lower complexity or cost. This applies to both splitters low pass filters in FIG. 2 and the single low-pass at the customer equipment in FIG. 3.

Furthermore, as a result of the present invention, generation of POTS (AC<1 V) with POTS DC and the POTS ringing indication and ADSL (AC<3 V RMS becomes possible with a single AC driver. It is indeed recognised in prior art systems that sending the POTS DC voltage, the POTS ringing voltage and the ADSL AC signal from a single driver is not likely to be feasible. Such driver would either be complex and expensive, or it would be unable to send the ADSL signal during the full voltage ringing. On the contrary, the present invention makes it possible to send the ADSL signal during the ringing indication with no harmful interaction between ADSL and POTS signals.

The invention is described below in reference to a telephone system under ADSL principle. It should still be understood that the invention applies not only to this specification but also more generally to any telephone system using frequency division multiplexing for transmitting analogue telephone signals and digital data over the same line.

Figure 1:
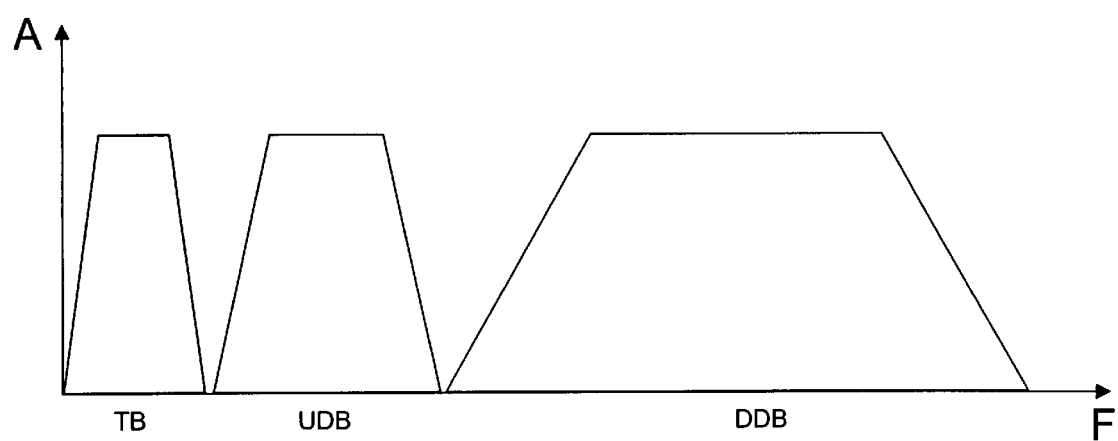
FIG. 1 shows a possible FDD frequency spectrum used in ADSL, above the telephone band.
Figure 2:
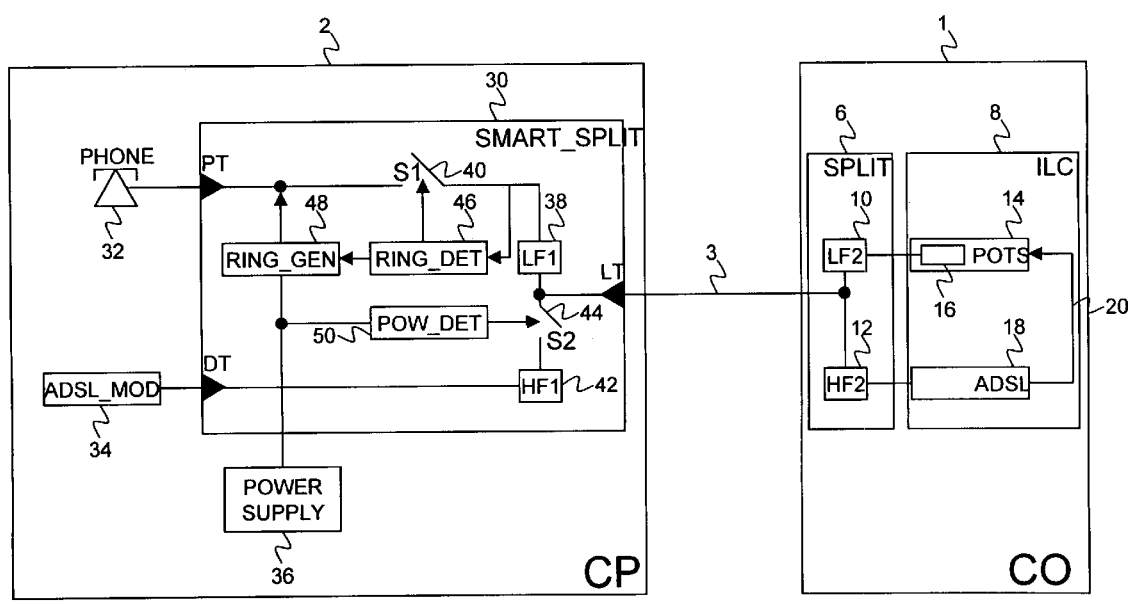
FIG. 2 is a schematic view of a telephone system using a splitter according to the invention, with a regular splitter at the central office.

FIG. 2 is a schematic view of a telephone system using a splitter according to the invention, where only the parts of the installation necessary for the understanding of the invention are shown and discussed. In the embodiment of FIG. 2, the central office installation uses a regular splitter. FIG. 2 shows the installation 1 at the central office, the installation 2 at the customer premises, and the line 3 connecting the customer premises to the central office. Line 3 is normally a twisted pair telephone line that serves as physical medium for simultaneous transfer of telephone signals and digital data. Installation 1 at the central office is located at the operator's side for simultaneously transmitting and receiving telephone calls and digital data over line 3. Installation 2 at the customer's premises has the same functionality, but is located at the customer premises. Installation 1 on the central office side comprises a splitter 6 connected to line 3.

The splitter is also connected to an integrated line card 8; this card contains functionality for both transfer of digital data and for transfer of telephone signals.

Splitter 6, as discussed below, has functionality for splitting telephone signals and digital data in the upstream direction and for combining telephone signals and digital data in the downstream direction. In other words, the splitter carries out multiplexing and demultiplexing of the frequency multiplexed signals. More specifically, splitter 6 contains means for filtering telephone signals and digital signal; the filtering means are connected to the line 3. In the embodiment of FIG. 2, the filtering means comprise a low pass frequency filter LF2 10, that passes the telephone band TB and not the digital bands UDB and DDB. The filtering means further comprise a high pass frequency filter HF2 12, that passes the digital bands UDB and DDB, but not the telephone band TB.

Low pass frequency filter 10 is connected to a POTS device 14 of integrated card 8. POTS device 14 incorporates all functionality for supporting transmission and receipt of telephone signals. Due to the use of a lower amplitude ringing indication signal, it is possible to use for the POTS part 14 a single driver. This driver generates power for POTS transmission—typically AC below 1 V —, the POTS DC power supply, and the POTS ringing indication signal—typically AC far below 10 V —. POTS device 14, apart from usual components for ensuring these functions, comprises an optional ring generator 16. The ring generator 16 may preferably be able to produce a regular ringing signal, and is needed if the single POTS driver of part 14 is not able to send a full ringing signal. The generator 16 could also be adapted to produce and send toward line 3 a ringing indication signal with a substantially lower amplitude than a traditional ringing signal, in order to announce an incoming telephone call.

Figure 3:
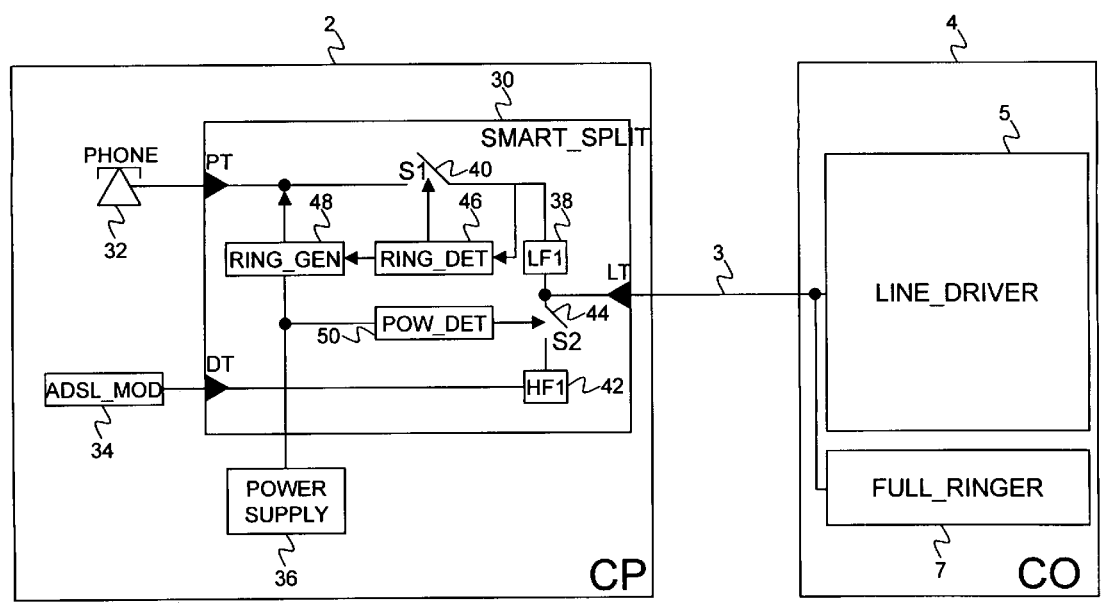
FIG. 3 is a schematic view of a telephone system using a splitter according to the invention, but with a single integrated driver at the central office, able to send all needed combination of signals to the telephone and the digital data receiver.

FIG. 3 is a similar schematic view of a telephone system using a splitter according to the invention, where only the parts of the installation necessary for the understanding of the invention are shown and discussed. FIG. 3 (just like FIG. 2) shows an installation 4 at the central office, the installation 2 at the customer premises, and the line 3 connecting the customer premises to the central office. Installation 2 at the customer premises and line 3 are identical as in FIG. 2. Installation 4 at the central office is different, in this way that the POTS and ADSL signals are generated from a single driver 5 and an optional full ringer 7, where the explicit low pass and high pass filters of the splitter/combiner are absent.

Installation 4 on the central office side comprises a single driver 5 connected to line 3; the card contains functionality for both transfer of digital data and for transfer of telephone signals.

Driver 5 incorporates all functionality for supporting transmission and receipt of telephone signals. Due to the use of a lower amplitude ringing indication signal, it is possible to use for a single driver for driver 5. This driver generates power for POTS transmission—typically AC below 1 V —, the POTS DC power supply, and the POTS ringing indication signal—typically AC far below 10 V —. If desired (optionally) the driver 5 is also able to send the full amplitude POTS ringing signal. However, the simultaneous sending by driver 5 of full amplitude ringing and ADSL signals is not needed. If the driver 5 is not able to send a full ringing signal, and if this signal must be send, there is an optional ring generator 7, able to generate a traditional ringing signal, in order to announce an incoming telephone call. However, when generator 7 is active there is no need to connect the driver 5 to the line and to send ADSL in parallel with the full ringing signal. Moreover, then there is no need to protect the ADSL transmission on line 3 from the full ringing with a low pass filter: the ADSL is not active.

In both case 1 and 2 (FIGS. 2 and 3) typically, the ringing indication signal would have a voltage amplitude of much less than the normal 70 V RMS. It would preferably have a voltage amplitude below 20 V RMS, and most preferably below 10 V RMS. The upper limit derives from the possible preferred use of a single power driver in the central office, as discussed above. In addition, an upper limit to the power makes it easier to design the splitter filters, because the unwanted noise is proportional to the signal level. The lower limit derives from the need to detect the ringing indication signal. A lower limit of 1 V and a typical value of 3 V RMS ensure that the ringing indication signal remains easily detectable. Indeed, a ringing indication signal with a power of less than 0.4 mW would be difficult to detect with simple components and at a low cost; this power corresponds to a lower voltage amplitude range from 0.2 to 0.5 V RMS, for a characteristic impedance between 100 and 600, in view of the well known relation $P=V^2/R$.

In addition, the ringing indication signal does not need have a rectangular shape, but may have any shape that makes the signal detectable. It is preferable to use a signal having a shape smoother than a rectangular shape, that is a shape that does not generate high frequency components. With a rectangular shape of the prior art, the ringing signal (e.g. through a relay) generates an impulsive disturbance of the ADSL signals at both begin and end. When the ringing indication signal is generated in a single driver, able to send also the AC and DC of the POTS (as in FIG. 2) or from a driver 5 able to send AC and DC of POTS and ADSL simultaneously (as in FIG. 3), the shaping can be easily accomplished.

The ringing indication signal may have an ultra-low frequency, that is a frequency below the telephony band, like the currently used ringing signal, that has a frequency around 30 Hz. Alternatively, the ringing indication signal may have a frequency equal to the frequency of one of the data carriers defined for the transmission of the digital signals, but outside of the used transmission band of the digital signals. This would be advantageous for the single AC driver 5 of FIG. 3. Because all carriers are orthogonal in a DMT (digital multi tone) based ADSL, there is no disturbance of data traffic by a ringing indication signal with such a frequency. In the ADSL system standardised by ANSI and ITU, the data carriers have a frequency that is an integer multiple of 4.3125 kHz, and are transferred at a nominal power of 0.43125 mW. The first data carrier is located at 4.3125 kHz, which is just above the usual telephony band, and when transmitted with a power of 0.43125 mW would constitute an appropriate and easily detectable ringing indication signal.

High pass frequency filter 12 is connected to an ADSL device 18 of integrated card 8; ADSL device 18 has the functionality for transmitting and receiving digital data over telephone line 3.

In the case of FIG. 2, operation of installation 1 at central office is the following. For upstream transmission, installation 1 operates as in the prior art. Frequency multiplexed signals are received by splitter 6; telephone signals are filtered by low pass filter 10 and are transmitted to POTS device 14, where they are further processed, as usual in any POTS system. Digital data received on line 3 are filtered by high pass filter 12, and are transmitted to ADSL device 18, where they are further processed.

For downstream transmission, ADSL device 18 transmits digital data to splitter 6. For announcing incoming telephone calls to the customer, POTS device 14 generates a ringing indication signal. The ringing indication signal is generated by the regular AC and DC driver of the POTS device 14. It could also be done by the ringing generator 16, if this is better suited. In any case, and as discussed above, the ringing indication signal has a voltage amplitude lower than the usual 70 V ringing signal and a smoother shape.

In one embodiment of the invention, POTS device 14 may also generate usual ringing signals, at the usual amplitude. As discussed below, this may be the case where the splitter located at the customer premises fails (e.g. due to the lack of the AC mains voltage), or when no digital transmission is currently occurring. Arrow 20 on FIG. 2 from ADSL device to POTS device is representative of a command sent to POTS device for indicating that a usual ringing signal may be sent, or has to be sent. This regular ringing could be generated by the regular AC and DC driver of the POTS AC DC driving device inside 14, or by a dedicated full ringing generator 16, if the regular AC and DC driving device is unable to do this. Note that full ringing is applied only when the ADSL service is not active, or, if the ADSL is kept active during full ringing, that the ADSL service can not be protected from disturbances caused by the full ringing.

Splitter 6 combines signals from POTS device and ADSL device, and transmits downstream multiplexed signals to customer premises 2, over line 3.

In the case of FIG. 3, the operation of installation 4 at the central office side is similar to the operation of installation 1, as far as results are concerned. However, the signals are not generated by separate components, but by the integrated driver 5, and if necessary, by the optional full ringer 7. The integrated driver 5 issues POTS AC, DC, ringing indication, optional full ringing and ADSL AC signals. The optional full ringer 7 may be needed where integrated driver is not able to send full ringing signals.

The operation of installation 2 at customer premises is identical for the embodiments of FIGS. 2 and 3. Installation 2 at the customer premises comprises a splitter 30. The splitter 30 is connected to line 3. It is also connected to a telephone 32, e.g. a traditional telephone apparatus. Splitter 30 is further connected to a device for generating digital data, e.g. an ADSL modem 34. The modem may for instance be adapted to transmit and receive digital data, in accordance with American ADSL standard ANSI T1E1.413. There is also shown on FIG. 2 a power supply device 36, for powering splitter 30. This device may comprise a battery or the like, or the customer's home electrical network. The same power supply device 36 could be used for powering ADSL modem 34.

Splitter 30 has the following functionality. For upstream transmission, it may, like a splitter of the art, combine signals originating from both the telephone 32 and the ADSL modem 34, and transmit the frequency multiplexed signals to the central office 1, over line 3.

For downstream transmission, splitter 30, when receiving a ringing indication signal representative of an announcement of a POTS call, generates locally a ringing signal having the usual amplitude, and applies this signal to telephone 32. This makes it possible to use a standard telephone set with the splitter. In addition, splitter 30 separates incoming POTS and ADSL signals; it transmits POTS signals to the telephone, and ADSL signals to ADSL modem 34.

Thus, splitter 30 carries out multiplexing and demultiplexing of analogue telephone signals and digital data signals. It also generates and applies to the telephone the ringing signal, when a ringing indication signal is detected.

According to the invention, the use of a ringing indication signal, having lower amplitude, makes it possible to reduce the order of the low pass filter and high pass filter used in the splitter. Typically a filter of the $2^{nd}$ order may be used for a ringing indication signal having a voltage amplitude below 10 V RMS with no detectable signal in the frequency band used for the ADSL (where the frequency of the ringing indication signal is below the telephone band). This may easily be checked, either with a spectrometer in the digital signals transmission band, or by measuring error rates for digital transmission, with and without the ringing indication signal.

The invention also makes it possible to reduce the frequency gap between POTS and ADSL bands. In the prior art, the band of the low-pass filter of the splitter usually extends up to 10 to 12 kHz, although the POTS signals are actually limited to 3.4 kHz, while UDB and DDB bands start from a frequency of 30 kHz. The gap between ADSL and POTS is therefore around 26 kHz. According to the invention, this ADSL signal could start above 20 kHz, while still ensuring enough rejection in each band.

The detailed structure of the splitter in the preferred embodiment of the invention is now described. In the preferred embodiment of FIG. 2, the splitter includes means for indicating to the central office 1 that the splitter 30 has failed (most often, when the AC mains voltage is not available). This makes it possible to change to normal operation, with a high voltage ringing signal.

The splitter comprises a low pass filter LF1 38, connected to port LT for line 3. In addition, low pass filter 38 is connected to port PT for telephone 32, via a switch S1 40. The splitter comprises a high pass filter HF1 42, connected to port DT for digital signals, and connected to port LT for line 3 via a switch S2 44.

Detecting means 46 for detecting ringing indication signal are connected between switch 40 and low pass filter 38. Detecting means 46 output a signal representative of the presence of a ringing indication signal to ringing signal generation means 48. Detecting means 46 further control switch 40.

Ringing signal generation means 48 receive from detecting means 46 the signal representative of the presence of a ringing indication signal. They are adapted to apply a ringing signal to port PT for the telephone 32. The ringing signal is a usual 70 V RMS ringing signal, of the type expected by a phone 32. Means 48 are powered by the power supply device 36.

Last, the splitter 30 comprises power detecting means 50, connected to the power supply device 36 for detecting whether splitter 2 receives appropriate power. Power detecting means control switch 44, as explained below. Power detecting means and switch 44 allow the system to switch to usual operation with a standard ringing signal, as indicated below.

The operation of the splitter of FIG. 2 is the following. For normal operation, switches 40 and 44 are both closed. When a ringing indication signal is transmitted by the central office, it is received, filtered by low pass filter 38, and detected by detecting means 46. Upon detecting a ringing indication signal, detecting means 46 open switch 40, and output to ringing signal generating means a signal representative of the presence of a ringing indication signal.

When receiving this signal, the ringing signal generating means 48 output a ringing signal of the usual type. Since the switch 40 is open, the ringing signal is only applied to the phone port 32 and to the phone. It is not applied to line 3, nor to high pass filter 42. The ringing signal is applied at the cadence of the ringing indication signal, till the phone 32 goes off-hook or until the ringing indication stops. The ringing signal is then stopped, and switch 40 is again closed. The splitter then operates as a known splitter, independently whether the telephone is left on-hook or was taken off-hook: it combines analogue signals (AC and DC) from the phone and digital signals from the ADSL modem, and transmits frequency multiplexed signals over line 3 for upstream transmission. For downstream transmission, it receives frequency multiplexed signals from line 3, and forwards telephone band signals to telephone port, and digital signals to ADSL modem port.

When power supply fails, or more generally when the splitter does not operate, switch 44 is opened by power detecting means 50. In this case, ADSL modem is separated from line 3, so that digital data transmission is stopped. This may be detected at the central office 1, as an indication that splitter 30 does not operate, and that a standard ringing signal should be used. In this case, the use of a standard ringing signal will not be a problem, digital data transmission being interrupted.

The power detecting means and the switch 44 could be done without. This could be the case where splitter 30 is powered by the same power supply as the ADSL modem 34. Failure of the power supply would in this case be indicative of the fact that a ringing signal with the usual amplitude should be used. At the central office, the ADSL device 18 may detect lack of any digital signal on line 3, and transmit this to POTS device 14, as indicated by arrow 20. Thus, telephone service may be maintained, even if power supply fails at the customer's premises. One may also decide to use a standard ringing signal, when no digital data transmission is taking place.

The invention thus ensures telephone operation including ringing, even in case of failure of local power supply.

The invention was described in reference to the preferred ADSL embodiment. It applies to other types of multiplexed telephone systems. It is of course optional to include the POTS device and the ADSL device in the same line card, at the central office. One could also include the ADSL modem or the like in the splitter.

While the principles of the invention have been described above in connection with specific apparatus, it is to be clearly understood that this description is made only by way of example and not as a limitation on the scope of the invention.

What is claimed is:

1. A telephone system wherein analog telephone signals are frequency multiplexed with digital data signals for transmission over a line, wherein at a receiver at a customer premise, a standard POTS ringing signal is generated upon the detection of a ringing indication signal having a voltage amplitude less than 30 V RMS and comprising a spectrum that lacks detectable components in a frequency band that is used for digital data signals at a time when the ringing indication signal announces an incoming telephone call.

2. The telephone system of claim 1, wherein said ringing indication signal has a voltage amplitude less than 20 V RMS.

3. The telephone system of claim 1, wherein said ringing indication signal has a voltage amplitude higher than 1 V RMS.

4. The telephone system of claim 1, wherein said ringing indication signal has a voltage amplitude higher than 10 V RMS.

5. The telephone system of claim 1, wherein the ringing indication signal has a frequency lower than the frequency of analog telephone signals.

6. The telephone system of claim 1, wherein the ringing indication signal has a frequency that is one frequency of a set of available data carriers for digital signals, said digital data signals being transmitted using data carriers above said one frequency.

7. A central office installation for transmitting and receiving frequency multiplexed analog telephone signals and digital data signals over a line, wherein the installation comprises:
   a splitter for demultiplexing and multiplexing analog telephone signals and digital data signals,
   a digital data signals device connected to the splitter for transmitting and receiving digital data signals, and
   an analog telephone signals device connected to the splitter for transmitting and receiving analog data signals, wherein the analog telephone signals device generates a standard POTS ringing signal when a ringing indication signal is detected, the ringing indication signal having a voltage amplitude less than 30 V RMS and comprising a spectrum that lacks detectable components in a frequency band that is used for digital data signals at a time when the ringing indication signal announces an incoming telephone call.

8. The installation of claim 7, wherein said ringing indication signal has a voltage amplitude less than 20 V RMS.

9. The installation of claim 7, wherein said ringing indication signal has a voltage amplitude higher than 1 V RMS.

10. The installation of claim 7, wherein said ringing indication signal has a voltage amplitude higher than 10 V RMS.

11. The installation of claim 7, wherein the ringing indication signal has a frequency lower than the frequency of analog telephone signals.

12. The installation of claim 7, wherein the ringing indication signal has a frequency that is a frequency of a data carrier for the digital signals.

13. The installation of claim 7, wherein the analog telephone signals device transmits a ringing signal for announcing an incoming telephone call when said digital data signals device does not receive digital data signals, said ringing signal having a voltage amplitude higher than said ringing indication signal.

14. The installation of claim 7, wherein said splitter comprises a low pass filter for filtering analog telephone signals, and a high pass filter for filtering digital data signals, and wherein the order of said low pass and high pass filters is less than 5.

15. A splitter for transmitting and receiving frequency multiplexed analog telephone signals and digital data signals over a line port, said splitter comprising:
   means for demultiplexing and multiplexing analog telephone signals and digital data signals,
   a telephone port for transmitting and receiving analog telephone signals to and from said demultiplexing and multiplexing means, and
   ringing signal generation means for generating a ringing signal applied to the telephone port when a ringing indication signal is received over said line port, wherein the ringing indication signal has a voltage amplitude less than 30 V RMS and a spectrum that lacks detectable components in a frequency band for digital data signals at a time when the ringing indication signal announces an incoming telephone call.

16. The splitter according to claim 15, wherein said ringing indication signal has a voltage amplitude less than 30 V RMS.

17. The splitter of claim 15, wherein said ringing indication signal has a voltage amplitude less than 20 V RMS.

18. The splitter of claim 15, wherein said ringing indication signal has a voltage amplitude higher than 1 V RMS.

19. The splitter of claim 15, wherein said ringing indication signal has a voltage amplitude higher than 10 V RMS.

20. The splitter of claim 15, wherein the ringing indication signal has a frequency lower than the frequency of analog telephone signals.

21. The splitter of claim 15, wherein the ringing indication signal has a frequency that is the frequency of a data carrier for the digital signals and the ringing signal has a voltage amplitude higher than the ringing indication signal.

22. The splitter of claim 15, further comprising switching means for isolating said telephone port from said line port when a ringing signal is generated and applied to said telephone port.

23. The splitter of claim 15, wherein said demultiplexing and multiplexing means comprise a low pass filter for filtering analog telephone signals, and a high pass filter for filtering digital data signals, and wherein the order of said low pass and high pass filters is less than 5.

24. The splitter of claim 15, further comprising a digital data signals port for transmitting and receiving digital data signals to and from said demultiplexing and multiplexing means, switching means between said digital data signals port and said line port, and power detection means for detecting improper power supply to the splitter and for opening said switching means when improper power supply is detected.

25. A central office installation for transmitting and receiving frequency multiplexed analog telephone signals and digital data signals over a line, wherein the installation comprises:

a splitter for demultiplexing and multiplexing analog telephone signals and digital data signals, a digital data signals device connected to the splitter for transmitting and receiving digital data signals, and an analog telephone signals device connected to the splitter for transmitting and receiving analog data signals, wherein the analog telephone signals device transmits a ringing indication signal for announcing an incoming telephone call, the ringing indication signal having a voltage amplitude less than 30 V RMS, wherein the analog telephone signals device transmits a ringing signal for announcing an incoming telephone call when the digital data signals device does not receive digital data signals and the ringing signal has a voltage amplitude higher than the ringing indication signal.

* * * * *